United States Patent [19]

Papez

[11] 4,332,222
[45] Jun. 1, 1982

[54] CAMSHAFT FOR AN INTERNAL COMBUSTION ENGINE

[75] Inventor: Stanislav Papez, Wolfsburg, Fed. Rep. of Germany

[73] Assignee: Volkswagenwerk Aktiengesellschaft, Wolfsburg, Fed. Rep. of Germany

[21] Appl. No.: 37,697

[22] Filed: May 10, 1979

[30] Foreign Application Priority Data

May 20, 1978 [DE] Fed. Rep. of Germany ....... 2822147

[51] Int. Cl.³ ............................................. F01L 1/34
[52] U.S. Cl. ............................. 123/90.17; 123/90.31; 464/4
[58] Field of Search .............. 123/90.15, 90.17, 90.31, 123/90.27, 90.6, 501, 420; 64/25

[56] References Cited

U.S. PATENT DOCUMENTS

| | | | |
|---|---|---|---|
| 1,301,972 | 4/1919 | Ricardo | 123/90.17 |
| 1,527,456 | 2/1925 | Woydt et al. | 123/90.17 |
| 3,144,009 | 8/1964 | Goodfellow | 123/90.17 |
| 3,516,394 | 6/1970 | Nichols | 123/90.17 |
| 3,828,579 | 8/1974 | Groom | 64/25 |

FOREIGN PATENT DOCUMENTS

| | | | |
|---|---|---|---|
| 2232438 | 1/1974 | Fed. Rep. of Germany | 123/90.31 |
| 2747884 | 5/1979 | Fed. Rep. of Germany | 123/90.17 |
| 1109790 | 2/1956 | France | 123/90.17 |

Primary Examiner—Craig R. Feinberg
Assistant Examiner—W. R. Wolfe
Attorney, Agent, or Firm—Brumbaugh, Graves, Donohue & Raymond

[57] ABSTRACT

A camshaft for an internal combustion engine having a hollow shaft carrying one or more cams or partial cams for rotation therewith and an inner shaft disposed within the hollow shaft and rotatable relative to the hollow shaft. The inner shaft has one or more cams or partial cams disposed outside the hollow shaft attached for rotation with the inner shaft through clearances in the hollow shaft. A camshaft drive includes a means responsive to the parameter characteristic of engine operating conditions for adjusting the rotational position of at least one of the shafts relative to the drive. The adjustment mechanism includes a radially extending guide on the drive, and an adjustment cam having a cam surface thereon and mounted on the guide to be radially displaceable therealong. A means is provided responsive to the desired engine parameter for varying the radial displacement of the adjustment cam. A cam follower bears on the cam surface and is coupled to one of the shafts for adjusting the relative rotational position of the one shaft.

16 Claims, 12 Drawing Figures

CAMSHAFT FOR AN INTERNAL COMBUSTION ENGINE

BACKGROUND OF THE INVENTION

The present invention relates to a camshaft for a drive, preferably an internal combustion engine.

In a four stroke internal combustion engine, the shapes of the cams actuating the engine inlet and exhaust valves determine the timing of the intake and exhaust valves relative to the top dead center of the piston movements. The particular cam shapes, therefore, affect the engine output torque gradient, instantaneous engine speed, idling, fuel consumption, and exhaust emissions of the engine. In addition to the opening times, the shapes of the cams also determine the time the valves remain open, which likewise affects operation. With narrow intake cams, the intake valves can be controlled to ensure optimum mixture delivery at low engine speed. On the other hand, better engine output is achieved at higher speeds with a wider (peak) cam, but a torque loss results at lower speeds.

Control of the timing of the engine valves also influences the exhaust gas emissions. The sooner the exhaust valves open, the sooner the oxidation process in the combustion chamber is interrupted, and the larger the resulting hydrocarbons in the exhaust gas. If the exhaust valve closes earlier, or the intake valve opening time is advanced, the proportion of the residual gas in the exhaust gas increases and $NO_x$ is reduced. The closing time of the intake valve, however, has relatively little effect on exhaust gas emission.

In previous designs, the engine conditions resulting from different control times of the intake and exhaust valves were considered separately. The overlap times of the opening of the intake and exhaust valves, however, also affects the exhaust gas make-up. A large overlap at top dead center results in balky idling and increased fuel consumption during idling, and the exhaust gases contain a higher share of hydrocarbons and carbon monoxide with lower $NO_x$. By decreasing the overlap, idling is improved, and there is a resulting decrease in fuel consumption, hydrocarbons, and carbon monoxide. In a diesel engine, on the other hand, a large overlap in top dead center may be desired to reduce knocking at cold temperatures.

As a result of these considerations, intake and exhaust cams are normally provided with distances between peaks which constitute a compromise for the various speeds and operating loads of the engine.

German OS No. 1,924,114 discloses a camshaft for an internal combustion engine in which the width of the cam is varied in accordance with engine speed. The operating cams each consists of two partial cams, one of which is carried on an outside hollow shaft, the other is carried on a rotatable inner shaft. By pivoting the shafts relative to each other, the width of the compound cam is changed. One of the shafts is rigidly connected to the drive gear for the camshaft. A centrifugal regulator has a cresent shaped weight which with increased engine speed (and thus camshaft rpm) swivels about an eccentric center of mass on the drive gear in opposition to the force of a counter-spring. The motion of the weight is transmitted by a rod system to the other of the two shafts which is not rigidly coupled with the driving gear. This arrangement requires a complex structure, and the relative pivoting is not easily adjustable but is determined by the counter-spring and weight.

German OS No. 1,947,362 discloses a camshaft in which the distance between the intake and exhaust cam peaks may be modified as a function of engine speed. The device has a pair of aligned shafts whose ends in the zone of the timing drive gear are coupled by spacer segments. A centrifugal governor, having springs and a weight, is interposed between the segments to couple the segments. This arrangement requires a predetermined relative position of the intake and exhaust valves, and without a separate arrangement, provides only relative pivoting of the two shafts and not independent pivoting relative to top dead center of the engine piston. Also, this device is not suited for compound cams, wherein the width of the cam is modified.

In German OS No. 2,029,911, each cam is associated individually with a device for ficticious modification of the cam width as a function of the engine speed. This is obtained by a speed dependent variation of the position of a cam swivel axis eccentric relative to the shaft axis.

SUMMARY OF THE INVENTION

The present invention is a camshaft for an internal combustion engine having a pair of concentric shafts pivotable relative to each other through an adjustment mechanism. The separate shafts of the camshaft carry either cams or partial cams, such that the adjustment mechanism varies either the cam peak spacing or the cam width. The adjustment mechanism operates responsive to a parameter representative of engine operation, for example responsive to engine speed, load, or a combination of parameters.

More particularly, the camshaft has a hollow shaft with one or more cams or partial cams attached thereon and an inner shaft disposed within the hollow shaft and rotatable relative to the hollow shaft. A drive gear is coupled to the shafts for driving the camshaft. The inner shaft has one or more cams or partial cams disposed outside the hollow shaft and attached to the inner shaft through clearances in the hollow shaft. An adjustment mechanism responsive to a parameter characteristic of engine operating conditions is coupled to either the inner shaft or the outer shaft, or both, for adjusting the rotational position of the shaft or shafts relative to top dead center of the engine piston. The adjusting mechanism includes a radially extending guide on the drive gear and an adjustment cam having a cam surface and mounted on the guide to be radially displaceable therealong. A means, such as an eccentric weight, is provided for varying the radial displacement of the adjustment cam. A cam follower bears on the cam surface and is coupled to one of the shafts to adjust the relative rotational position of the one shaft.

In one form of the invention, the camshaft has a timing drive gear which is fixed on the hollow shaft for rotation therewith. A web-like guide depends from the gear and carries the adjustment cam. The cam follower is attached to the inner shaft by a lever. Changes in engine speed cause radial displacement of the adjustment cam against the force of a counter-spring, and thereby cam follower and inner shaft relative to top dead center.

In another embodiment of the invention, the timing drive gear is rotatable about both shafts. A web-like guide depends from the gear and carries the adjustment cam. The cam has a pair of cam surfaces, one of each engaging a cam follower. The first cam followers is attached by a lever to the inner shaft for adjusting the rotational position relative to the adjustment cam. The second cam follower is attached, by a second lever, to the hollow shaft. Changes in engine speed cause radial displacement of the adjustment cam and rotation of both the hollow shaft and the inner shaft, the amount of rotation of each depending upon the particular cam surface configuration engaging the respective cam follower.

In another embodiment of the invention, the timing drive gear is pivotally attached on the inner and outer shafts. A pair of eccentric weights are pivotally attached on the drive gear, and have a gear portion engaging a rack gear on the adjustment cam for varying the radial displacement of the cam. The rack gear engagement also acts as a radial guide for the adjustment cam. The radial outward force exerted by the eccentric weights on the adjustment cam, which is proportional to engine speed, acts in opposition to a spring which applies a variable counterforce depending upon another engine operating parameter, for example load. In one embodiment, the spring is seated between the adjustment cam and a radially extendable piston, controlled through a pressure delivery system. The control pressure, in turn, varies in accordance with the engine load conditions.

The relative adjustment of the inner shaft and hollow shaft may be used to vary the relative position of the cams, where the cams on one shaft actuate the intake valves and the cams on the other shaft actuate the exhaust valves.

Alternatively, the cams may be made up of partial cams, one part carried on the hollow shaft, and the other part of each compound cam carried on the inner shaft. By rotating the inner shaft relative to the outer shaft, the width of the cam (projecting portion) may be varied depending on engine operating conditions. Likewise, when both shafts are adjustable, the cam configuration affecting both opening and closing time relative to top dead center may be changed.

The cams associated with the inner shaft may be attached directly to the inner shaft through clearances in the hollow shaft. Alternatively, the cams associated with the inner shaft may be positioned around the hollow shaft to be supported radially by the hollow shaft, while the torsional support (rotational) is provided by the inner shaft. In an arrangement of this type, the inner shaft, and thereby the concentric double cam shaft arrangement, can be manufactured with a relatively small diameter, since the smaller diameter inner shaft is not required to provide radial support of the cam.

For a better understanding of the invention, reference is made to the following detailed description, and the drawings accompanying the application.

DETAILED DESCRIPTION OF A PREFERRED EMBODIMENT

Figure 1:
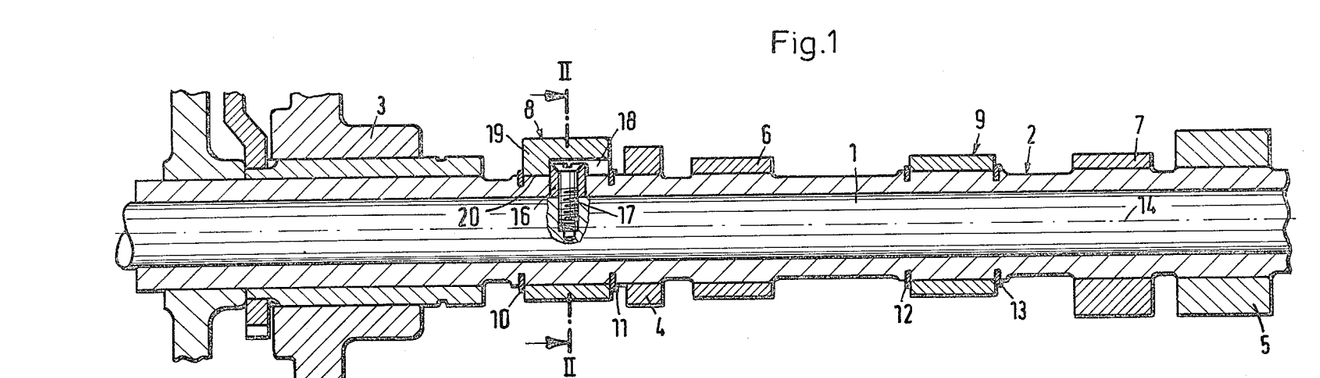
FIG. 1 is a longitudinal schematic sectional view through a camshaft having a hollow shaft and an inner shaft pivotally arranged in the hollow shaft.
Figure 2:
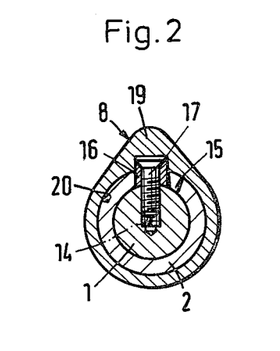
FIG. 2 is a cross-sectional view taken through lines II—II of FIG. 1.

Referring to FIGS. 1 and 2, a camshaft has an inner shaft 1 and a hollow shaft 2 concentric to and rotatable about the inner shaft. The hollow shaft, which is supported by a pair of eccentric bearings 4 and 5, has two exhaust cams 6 and 7 which are attached by shrink fit to zones of raised elevation on the shaft 2. The hollow shaft 2 also supports a timing drive gear 3 of the camshaft. The drive gear 3 is coupled to the engine by a transmission for synchronous rotation with the engine crankshaft.

The inner shaft 1 has a pair of associated intake cams 8 and 9 which are attached torsionally (rotationally) to be driven by the inner shaft 1. Radially, the cams 8 and 9 are supported by the outer shaft 2, as explained below. The intake cams 8 and 9 are fixed on the hollow shaft 2 in the axial direction by rings 10, 11, 12 and 13, but are rotatable about the hollow shaft 2 in a plane perpendicular to the axis of rotation 14 of the shafts.

Referring to FIG. 2, the intake cam arrangement 8 includes the cam 19 and a driving stud 16, which extends through a clearance 15 in the hollow shaft 2 and is attached to the inner shaft 1 by a screw 17. The inner shaft 1, drive stud 16, and the cam 19 are free to rotate relative to the hollow shaft 2 in the clearance 15. The drive stud 16 projects into an interior groove 18 of the cam 19, which permits the cam 19 to slide longitudinally relative to the stud 16, but prevents rotation of the cam 19 relative to the stud 16. At the same time, neither the shaft 1 nor the stud 16 supports the cam 19 in the radial direction. Instead, the cam 19 has a sleeve surface 20 which surrounds the hollow shaft 2, and radially applied forces on the cam 8 are transmitted across the sleeve surface 20 to the hollow shaft 2. At the same time, the sleeve 20 is in sliding relationship with the hollow shaft 2, such that upon pivoting of the inner shaft 1 and thereby the drive stud 16, the cam 19 is freely pivotable about the hollow shaft 2. The cam arrangement 8 is easily assembled on to the cam shaft 1, 2. Before the cam 19 is attached, the drive stud 16 is screwed to the inner shaft 1 by the screw 17. Thereafter, the cam 19 slides over the stud 16 from the left, until engaging the ring stop 11, with the projecting portion of the stud 16 received in the groove 18. Once the cam 19 is in position, a second retaining ring 10 is attached to the hollow shaft to retain the cam 19 longitudinally.

The attachment of the other intake cam 9 to the inner shaft 1 is identical with the intake cam 8.

With this arrangement, the inner shaft 1 is free to be rotated to advance or retard the rotational position of the intake cams 8 and 9. At the same time, the hollow shaft 2 is free to be pivoted relative to the inner shaft 1 to change the timing of the exhaust cams 6 and 7, in each case the intake or exhaust cams being adjustable without affecting the others. Thus, by adjusting the inner shaft 1 or the outer shaft 2, not only can the relative position of the intake and exhaust cams be changed, but the timing of the intake and exhaust cams relative to top dead center of the piston may be separately adjusted, as described below.

Figure 3:
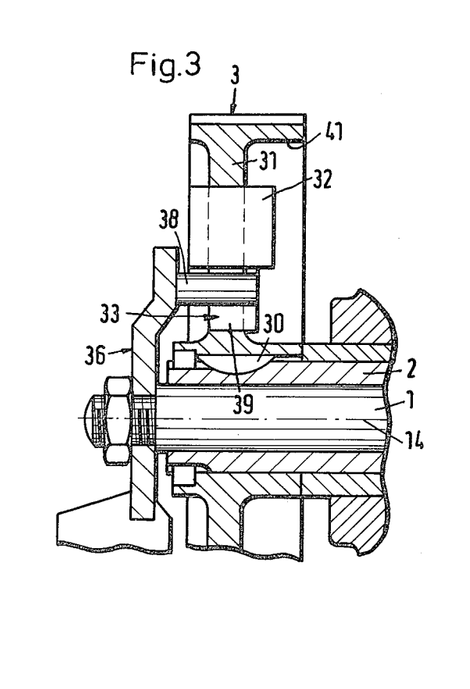
FIGS. 3 and 4 are longitudinal and front schematic views, respectively, of an embodiment of an adjusting mechanism for adjusting the relative rotational position of the inner shaft of the camshaft depending on engine speed.
Figure 4:
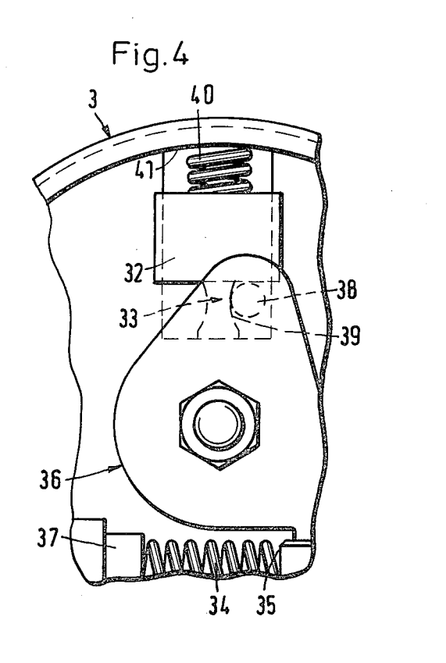

An adjustment mechanism associated with the cam shaft drive gear 3 controls the rotational position of the inner shaft 1 and hollow shaft. One such mechanism is illustrated in FIGS. 3 and 4. The camshaft drive gear 3, which is driven by a timing chain (not shown) coupled to the engine, is fixedly attached to the hollow shaft 2, for rotation therewith, by a key 30. The gear 3 has a web-like guide 31 depending therefrom, on which is mounted an adjustment cam 33 in radial sliding relation. An eccentric weight 32 is attached to the adjustment cam 33, and urges the adjustment cam 33 radially outwardly, with increasing engine speed, against the force of a counter-spring 40. The spring 40 bears against the eccentric weight 32 and adjustment cam 33 at one end and a bearing surface 41 on the gear 3 at its other end.

The adjustment cam 33 has a cam surface 39 for adjusting the position of the inner shaft 1. A lever 36 is fixedly attached to the inner shaft 1, and has a cam follower 38 which bears against the cam surface 39 to adjust the rotational position of the inner shaft 1 depending upon the radial position of the cam 33. The cam follower 38 is urged into engagement with the cam surface 39 by a spring 34 which extends between a fixed seat 37 and a seat 35 on the lever 36.

Figure 5:
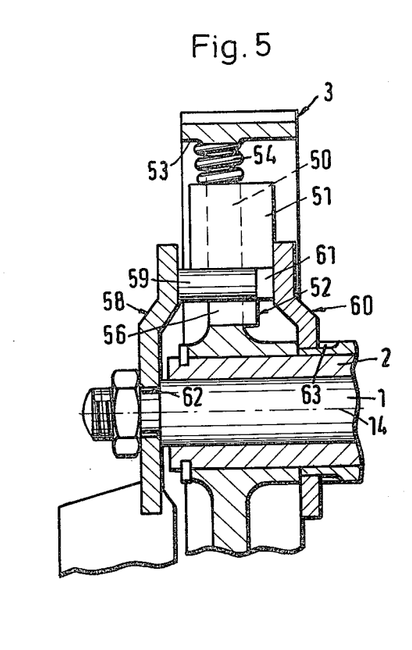
FIGS. 5 and 6 are longitudinal and front schematic views, respectively, of another embodiment of an adjusting mechanism for varying the rotational position of both the inner shaft and hollow shaft of the camshaft depending upon engine speed.
Figure 6:
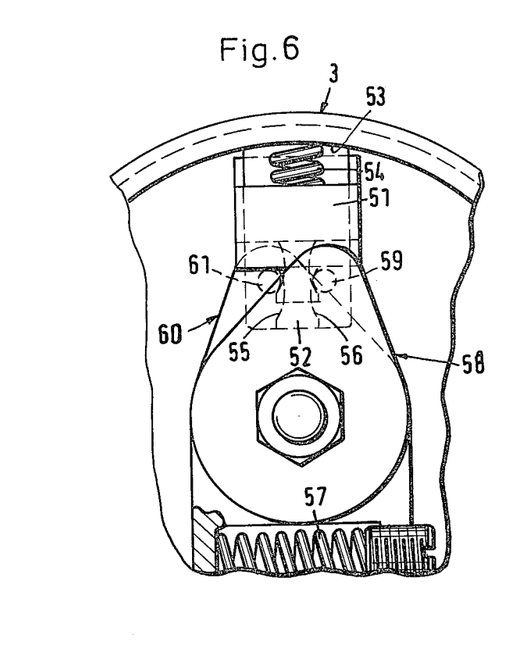

Referring to FIGS. 5 and 6, an embodiment of the adjustment device is illustrated for adjusting the rotational position of both the inner shaft 1 and hollow shaft 2. The camshaft drive gear 3 is rotatably mounted on the hollow shaft 2, and has a depending web guide 50 supporting an adjustment cam 52. The cam 52 has a pair of cam surfaces 55 and 56 for separately adjusting the rotational positions of the inner shaft 1 and outer shaft 2. An eccentric weight 51 is attached to the adjustment cam 52, to urge the cam 52 radially outwardly along the guide 50 with increased engine speed against the force of a counter-spring 54. The spring 54 is seated at 53 in the gear 3.

A first adjustment lever 58, fixedly attached to the inner shaft 1 by a spline 62, has a first cam follower 59 which bears upon cam surface 56, such that with axial displacement of the cam 52, the rotational position of the inner shaft 1 is accordingly changed. A second adjustment lever 60 is fixedly attached to the hollow shaft 2 by a spline 63 adjacent the gear 3, such that the hollow shaft 2 pivots relative to the gear 3 with corresponding pivoting of the second adjustment lever 60. A second cam follower 61 on the lever 60 bears on the second cam surface 55 of the adjustment cam 52. The cam followers 59 and 61 are urged into engagement with the cam surfaces 56 and 55, respectively, by a spring 57 extending between the adjustment levers 58 and 60. Accordingly, with radial displacement of the adjustment cam 52, the cam followers 59 and 61 are moved by the cam surfaces 56 and 55 to adjust the rotational position of the inner shaft 1 and hollow shaft 2 relative to the drive gear 3, and thus the top dead center of the engine pistons (since the gear 3 is in synchronous rotation with the engine crankshaft driving the piston). The adjustment of each of the shafts 1 and 2 is, relative to engine speed, independent of the other, and depends upon the particular cam surface 55 or 56, and the stiffness of the spring 54. (See infra relating to FIGS. 9-11).

Figure 7:
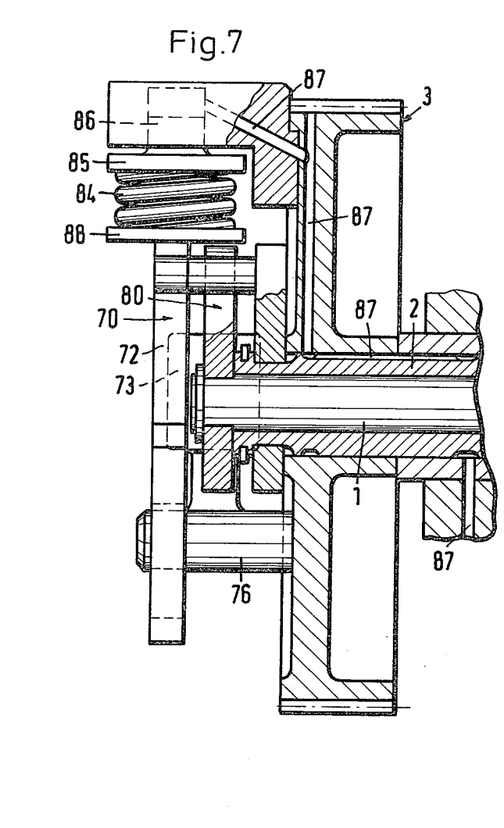
FIGS. 7 and 8 are longitudinal and front schematic views, respectively, of another embodiment of an adjusting mechanism for adjusting the rotational position of both the inner and hollow shafts responsive to both engine speed and engine load.
Figure 8:
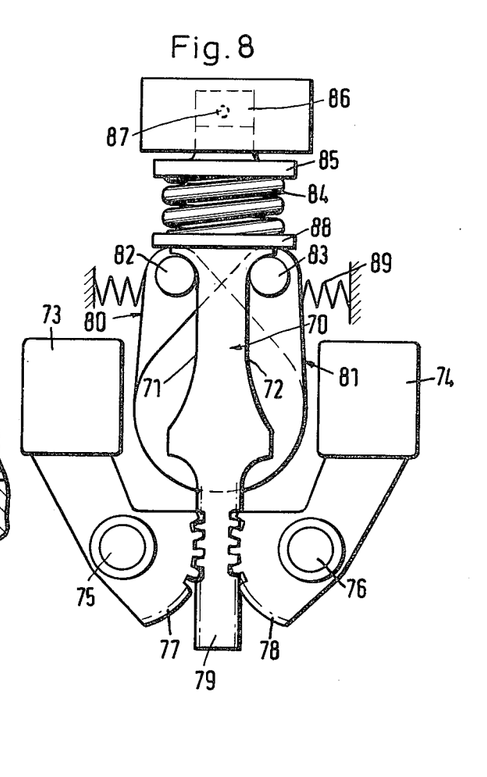

Referring to FIGS. 7 and 8, another adjustment mechanism which adjusts the position of both the inner shaft 1 and the outer shaft 2 relative to engine top dead center is illustrated. The adjustment mechanism is responsive not only to engine speed, but also to another engine parameter, for example, engine load.

As in the case of the embodiments shown in FIGS. 5 and 6, the camshaft drive gear 3 is rotatably mounted on the hollow shaft 2, such that the rotational position of both the inner shaft 1 relative to the gear 3 (and thereby top dead center of the engine) and of the outer shaft 2 relative to the gear 3 (and thereby top dead center of the engine) may be adjusted. A radially displaceable adjustment cam 70, having a pair of cam surfaces 71 and 72, acts upon a pair of cam followers 82 and 83. The cam followers 82 and 83 are attached to adjustment levers 80 and 81, respectively, which are rotationally fixedly attached to the inner and outer shafts 1 and 2, respectively. The cam followers 82 and 83 are urged into engagement with the cam surfaces 71 and 72 by a pair of springs 89.

The adjustment cam is urged radially outwardly with increasing engine speed by a pair of eccentric weights 73 and 74. The weights 73 and 74 are mounted on levers, pivotable about pins 75 and 76 on the drive gear 3. The levers of the adjustment weights each have gear portions 77 and 78 at one end, which engage cooperating rack gears 79 on the adjustment cam 70. The rack gear engagement also acts as a radial guide for the adjustment cam 70.

Increased rotational speed of the engine and thereby the drive gear 3 causes the weights 73 and 74 to pivot outwardly, driving the rack gear to move the adjustment cam 70 radially outwardly. The cam 70 moves against the force of a counterspring 84, which is seated at 88 in the adjustment cam 70, and, at its other end, in a movable seat 85.

The moveable seat 85 has a piston portion disposed in a pressure chamber 86. The pressure chamber 86 is connected to a pressure delivery system through a conduit 87, the conduit 87 extending along the hollow shaft and through the drive gear 3. Oil or any other suitable pressure medium is delivered through the conduit 87 to the pressure chamber 86, the pressure dependent upon a parameter representative of an engine operating condition. For example, conduit 87 may communicate with the intake system of the internal combustion engine, in which case the pressure controlling the position of the piston will be a negative pressure. In the case of a supercharged engine, the super charger pressure may be used. Whatever the source of pressure or negative pressure, the position of the seat 85 is controlled relative to the engine parameter, for example load, to increase or decrease the prevailing counter force of the spring 84 on the adjustment cam 70. The variable force exerted by the spring 84, in turn, determines the degree of radial displaceability of the cam 70, since the force exerted by the eccentric weights 73 and 74 remain constant for any given engine speed.

Figure 9:
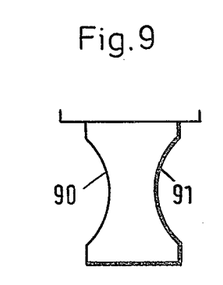
FIGS. 9–11 are front schematic views of various adjustment cams for use with the adjusting mechanism according to the present invention.
Figure 10:
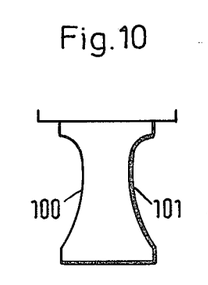
Figure 11:
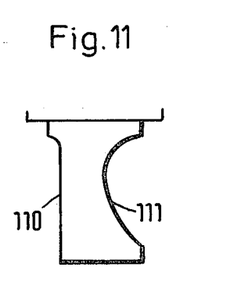

FIGS. 9, 10, and 11, illustrate representative shapes of adjustment cams which may be used in the adjustment mechanism described in FIGS. 1-8. Since the adjustment cams are separate components of the mechanism, it is possible to interchange the cams shown in FIGS. 1-8 with cams suitable for the particular operating purpose, depending upon the intended use of the particular adjustment mechanism. Also, for test purposes, the adjustment cams are easily interchanged. As illustrated, the rotational position of the inner shaft 1 relative to top dead center is independent of the corresponding position of the hollow shaft 2 relative to top dead center. With the adjustment cam in FIG. 9, the relative advance and retarding of the two shafts will be the same, since the cam surfaces 90 and 91 are symmetrical. The cam surfaces 100 and 101 of the FIG. 10 adjustment cam are symmetrical relative to each other, but are not self-symmetric. In FIG. 11, on the other hand, the two cam surfaces 110 and 111 are totally asymmetric, with the resulting asymmetric pivoting of the inner shaft 1 and hollow shaft 2. From these examples, it is evident that the inner shaft 1, and thus the intake cams, for example, may be adjusted relative to engine top dead center completely independently of the rotational position of the hollow shaft 2 and thus the exhaust cams, for example.

Figure 12:
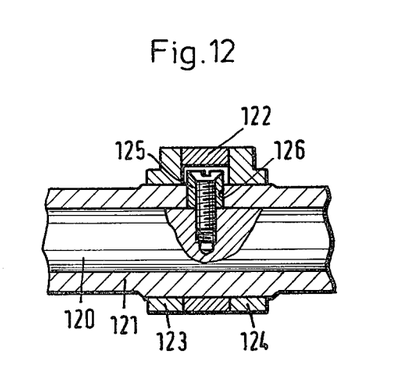
FIG. 12 is a longitudinal sectional view of a portion of the inner and hollow shafts of a camshaft having a compound adjustable cam thereon.

Referring to FIG. 12, a compound cam, the width of which may be adjusted using one of the aforedescribed adjustment mechanisms, is illustrated. The camshaft has a hollow shaft 121 and an inner shaft 120 disposed in the hollow shaft 121. A pair of partial cams 123 and 124 are fixedly attached to the hollow shaft 121. Another partial cam 122 is disposed between the partial cams 123 and 124, and is rotatably fixed to the inner shaft 120 by a drive stud 125 which is screwed into the inner shaft 120, and extends through a clearance 126 in the hollow shaft 121 to engage the partial cam 122 and impart a rotational (torsional) force to the cam 122 with corresponding rotation of the inner shaft 120, while also determining the relative rotational position of the cam 122. The inside sleeve of the partial cam 122 extends around the hollow shaft 121 in sliding engagement such that radial forces on the partial cam 122 are absorbed by the outer shaft 121, and not transmitted to the inner shaft, as in the case of the embodiment shown in FIGS. 1 and 2. Any of the aforementioned adjustment mechanisms may be used to change the relative position of the inner shaft 120 or the outer shaft 121, or both, relative to top dead center of the engine, to change the width of the compound cam, and also the timing of the initial opening and the closing of the valve by the projecting cam surface.

The embodiments described above are illustrative of the present invention. Modifications and variations of the embodiments described above will be apparent to those skilled in the art, without departing from the inventive concepts disclosed herein. For example, while the camshaft has been described with reference to operating intake and exhaust valves of the engine, it is possible that a camshaft arrangement with an adjusting device in accordance with the present invention be used, for example, in the engine distributor for effecting the desired ignition control. In such a case, an individual speed control device in the ignition distributor may be dispensed with. Also, it is possible to adjust the relative rotational position of the two shafts of the camshaft each as a function of a different engine operating parameter. For example, the rotational position of the hollow shaft may be controlled as a function of speed, and the rotational position of the inner shaft controlled as a function of the load. In such a case, an adjustment device for each shaft responsive to the particular control would be provided. The speed dependent adjustment device may be that shown in FIGS. 3 and 4. The load dependent adjustment device may be similar to that shown in FIGS. 7 and 8, except that the weights 73, 74, the rack gear 79, and the spring 84 are eliminated, the adjustment cam 70 is coupled directly to the pressure actuated piston 85, and the adjustment cam has only one cam surface (associated with the load controlled shaft 1 or 2). All such variations and modifications are intended to be within the scope of the present invention, as defined in the following claims.

I claim:

1. In a camshaft for a drive, preferably an internal combustion engine, having a hollow shaft carrying at least one of a cam and a partial cam for rotation therewith, an inner shaft disposed within the hollow shaft and rotatable relative to the hollow shaft, the inner shaft having at least one of a cam and a partial cam disposed outside the hollow shaft attached for rotation with the inner shaft through at least one clearance in the hollow shaft, and a drive gear for driving the camshaft, the improvement comprising means on said drive gear responsive to a parameter characteristic of operating conditions of the drive for adjusting the rotational position of at least one of said inner shaft and said hollow shaft relative to the said drive gear, the adjusting means including a radially extending guide means on said drive gear, an adjustment cam having a cam surface thereon and mounted on the guide means to be radially displaceable with respect to the drive gear therealong, wherein said cam surface extends generally radially to produce, upon radial displacement of said adjustment cam, lateral adjustment of a cam follower means which bears on said cam surface, means arranged between said drive gear and said adjustment cam, responsive to said parameter, for varying the radial displacement of said adjustment cam, cam follower means including a cam follower which bears on said cam surface, thereby to be laterally displaceable by said surface in response to radial movement of said adjustment cam, and biasing means for urging said cam follower against said cam surface, and means for coupling the cam follower means to one of said inner shaft and said hollow shaft for adjusting the relative rotational position of said one shaft.

2. The improvement according to claim 1, wherein said inner shaft and said hollow shaft carry at least one complete cam.

3. The improvement according to claim 2, wherein the cams associated with one of said inner shaft and said hollow shaft are arranged for actuating intake valves of said internal combustion engine and the cams associated with the other of said inner shaft and said hollow shaft are arranged for actuating exhaust valves of said combustion engine.

4. The improvement according to claim 1, wherein said each said cam and partial cam associated with said inner shaft have sleeve portions on said hollow shaft in sliding relation thereto to be supported radially by said hollow shaft.

5. The improvement according to claim 4, wherein the each said cam and partial cam associated with said inner shaft have a longitudinal groove for receiving a drive stud, the drive stud extending through the clearances of the hollow shaft and attached to said inner shaft.

6. The improvement according to claim 1, wherein said drive gear is coupled to the other of said inner shaft and said outer shaft for fixed rotation therewith.

7. The improvement according to claim 1, wherein said adjustment cam has a generally radially extending second cam surface thereon for producing lateral adjustment of said cam follower which bears on said cam surface, and further comprising second cam follower means including a second cam follower which bears on said second cam surface and coupled to the other of said inner shaft and said hollow shaft for adjusting the rotational position relative to said drive gear of said other shaft, and biasing means for urging said second cam follower against said second cam surface.

8. The improvement according to claim 1, wherein said biasing means comprises spring means arranged between said drive gear and said cam follower means for urging said cam follower means into engagement with said cam surface.

9. The improvement according to claim 7, wherein said biasing means comprises spring means arranged between said cam follower means and said second cam follower means for urging said cam follower means and said second cam follower means into engagement with said respective cam surfaces.

10. The improvement according to claim 1, 6, 7, 8, or 9, wherein the adjusting means comprises at least one eccentric weight connected with said adjustment cam for urging said adjustment cam radially outwardly upon rotation of said camshaft, and counter-spring means for resisting radially outward movement of said adjustment cam, wherein said adjustment cam is displaceable in response to the rotational speed of said drive gear.

11. The improvement according to claim 10, wherein said counter-spring means comprises a compression spring bearing against a spring seat on said drive gear.

12. The improvement according to claim 10, wherein the adjusting means comprises means for adjusting one of said inner shaft and said hollow shaft responsive to rotational speed of said drive gear and for adjusting the rotational position of the other of said hollow shaft and said inner shaft responsive to the load of the drive.

13. The improvement according to claim 1, 6, 7, 8, or 9, wherein said adjusting means comprises stop means for engaging said adjustment cam for determining the radial position of said adjustment cam and wherein said stop means is coupled to a pressure chamber, said stop means radially displaceable in said pressure chamber, and pressure delivery means responsive to engine load for varying the pressure in said pressure chamber for displacing said stop means.

14. The improvement according to claim 13, comprising counter-spring means arranged between said stop means and said adjustment cam, and wherein said stop means comprises a spring seat.

15. The improvement according to claim 13, wherein said pressure delivery means is coupled to a negative pressure in a suction system in the internal combustion engine.

16. The improvement according to claim 15, comprising counter-spring means arranged between said stop means and said adjustment cam, and wherein said stop means comprises a spring seat.

* * * * *